United States Patent
Tedijanto et al.

(10) Patent No.: US 6,859,431 B1
(45) Date of Patent: Feb. 22, 2005

(54) SYSTEM AND METHOD FOR CALCULATING PROTECTION ROUTES IN A NETWORK PRIOR TO FAILURE

(75) Inventors: Theodore E. Tedijanto, Cupertino, CA (US); Biao Lu, Cupertino, CA (US); Neeraj Gulati, Cupertino, CA (US); Gregory M. Bernstein, Fremont, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/493,344

(22) Filed: Jan. 28, 2000

(51) Int. Cl.[7] ................................................ H04J 3/14
(52) U.S. Cl. ........................ 370/223; 370/228; 370/539
(58) Field of Search ................................ 370/216–228, 370/236, 238, 539

(56) References Cited

U.S. PATENT DOCUMENTS

| | | | | |
|---|---|---|---|---|
| 5,636,212 A | * | 6/1997 | Ikeda ........................... | 370/233 |
| 5,848,055 A | * | 12/1998 | Fedyk et al. ................. | 370/228 |
| 5,933,422 A | * | 8/1999 | Kusano et al. .............. | 370/331 |
| 5,941,992 A | * | 8/1999 | Croslin et al. ................ | 714/4 |
| 6,141,319 A | * | 10/2000 | Dighe et al. ................. | 370/218 |
| 6,222,820 B1 | * | 4/2001 | Hamami ...................... | 370/218 |
| 6,636,529 B1 | * | 10/2003 | Goodman et al. .......... | 370/469 |

* cited by examiner

*Primary Examiner*—Chau Nguyen
*Assistant Examiner*—Soon-Dong Hyun
(74) *Attorney, Agent, or Firm*—Michael R. Cammarata; David L. Soltz (57) ABSTRACT

A system and method for automatically generating a protection route as an alternative to a working route through a network of switches prior to network failure. A switch selects the proposed protection route so that the protection route is disjoint from the working route. Next, a switch or switches determines whether bandwidth is available for the proposed protection route. If so, the protection route is set-up for activation when needed.

22 Claims, 6 Drawing Sheets

SYSTEM AND METHOD FOR CALCULATING PROTECTION ROUTES IN A NETWORK PRIOR TO FAILURE

RELATED APPLICATIONS

This application is related to currently pending U.S. patent application Ser. No. 09/259,263, filed Mar. 1, 1999, titled "Routing and Signaling in a Sonet Network", which is herein incorporated by reference.

BACKGROUND OF THE INVENTION

The present invention relates to a system and method for generating and setting up protection routes in a fiberoptic network of synchronous optical network (SONET/SDH) switches before any failures occur in the network.

Networks, both computer and telephone, have been around for many years. As the use of networks increased over time, so has the need for more bandwidth. Fiberoptic networks were developed to meet this need and transmit at high data rates. SONET was developed to be a standard for fiberoptic transmission.

Figure 1:
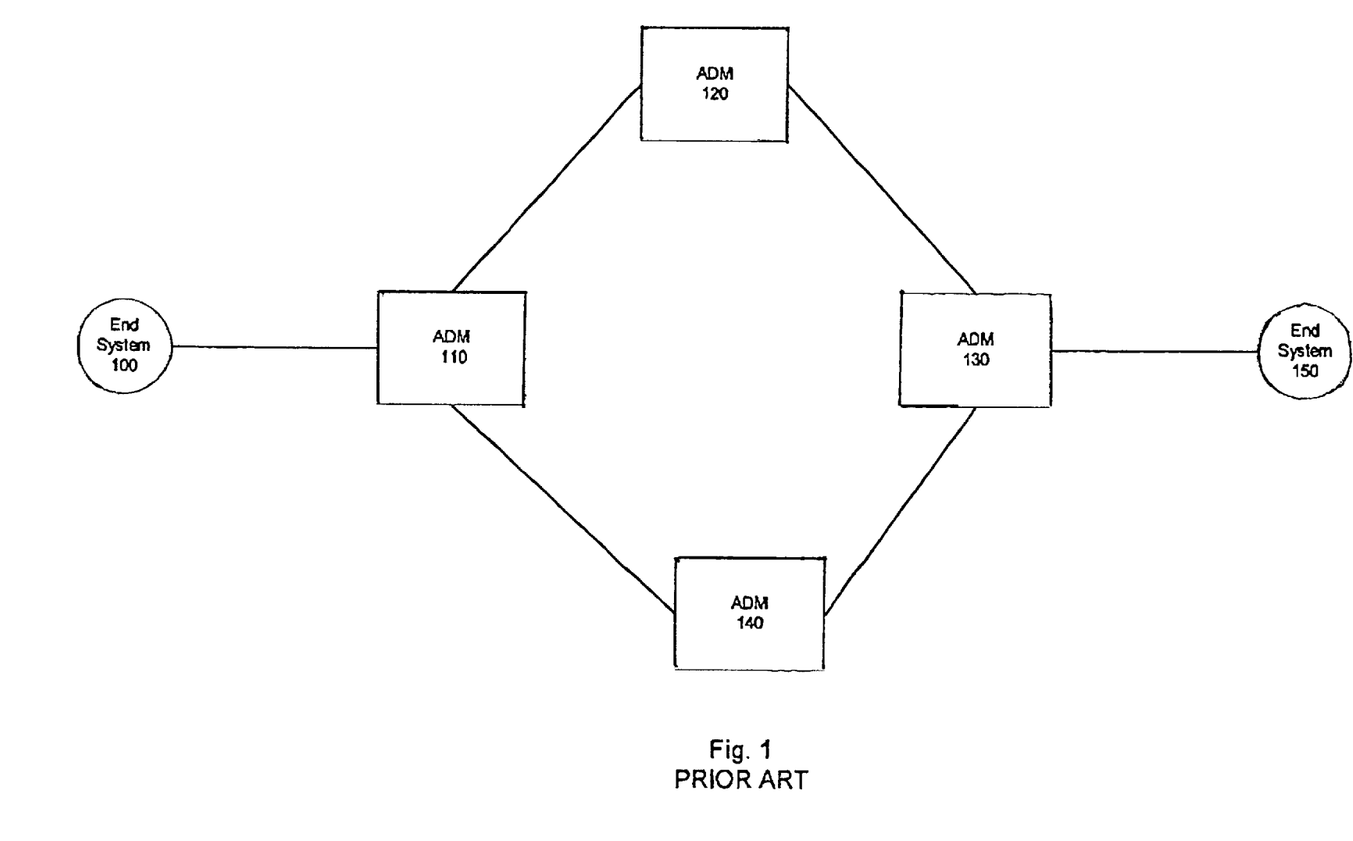
FIG. 1 shows an example SONET network according to the prior art.

An example, current SONET network is shown in FIG. 1. The nodes in this network have no information about other nodes in the network. Nodes are typically add/drop multiplexors (ADM). This network requires a system administrator to set up connection routes between end system 100 and end system 150 through ADMs 110–140. The system administrator may program the route to be from origination ADM 110 through intermediate ADM 120 to the destination ADM 130, and must program each ADM to pass information in this manner. If a failure occurs in any one of the connections, the system administrator must manually reroute the connections by reprogramming the ADMs.

The network described in the related application mentioned above, "Routing and Signaling in a SONET Network," allowed for automatically creating a topology of the network and generated a route between ports. When a network failure occurred, the origination node calculated an alternative or protection route.

There currently does not exist a method or system for calculating and setting up protection routes prior to failure in the network.

SUMMARY OF THE INVENTION

A system and method consistent with this invention select and set up protection routes prior to failures in the network.

Methods consistent with the present invention generate a protection route as an alternative route to a working route between optical network switches through links connecting the switches and comprises the steps of automatically selecting a protection route to pass messages from an origination switch to a destination switch through an intermediate switch where a minimal number of links included in physical bundles that correspond to the working route are included in the protection route and sending a set up message from the origination switch to the destination switch through the intermediate switch.

Another method consistent with the present invention sets up a protection route as an alternative route to a working route between optical network switches through links connecting the switches and comprises the steps of automatically selecting, prior to failure, a protection route to pass messages from an origination switch to a destination switch through an intermediate switch and checking whether each switch in the route has bandwidth available for the selected protection route.

A switch for use in a system, consistent with the present invention, generates a protection route as an alternative route to a working route between optical network switches through links connecting the switches, at least one switch in the network comprising structure for automatically selecting a protection route to pass messages from an origination switch to a destination switch through an intermediate switch where a minimal number of links included in physical bundles that correspond to the working route are included in the protection route. The switch further includes structure for sending a set up message from the origination switch to the destination switch through the intermediate switch.

A switch for use in a system, consistent with the present invention, sets up a protection route as an alternative route to a working route between optical network switches through links connecting the switches, at least one switch in the network comprising structure for automatically selecting, prior to failure, a protection route to pass messages from an origination switch to a destination switch through an intermediate switch. The switch further includes structure for checking whether each switch in the route has bandwidth available for the selected protection route.

Both the foregoing general description and the following detailed description explain examples of the invention and do not, by themselves, restrict the scope of the appended claims. The accompanying drawings, which constitute a part of this specification, illustrate systems and methods consistent with the invention and, together with the description, help explain the principles of the invention.

BRIEF DESCRIPTION OF THE DRAWINGS

The accompanying drawings, which are incorporated in and constitute a part of this specification, illustrate embodiments of the invention and, together with the description, serve to explain the advantages of the invention. In the drawings.

DETAILED DESCRIPTION OF THE INVENTION

The following detailed description refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention create and set up protection routes, that are alternative routes to working routes, prior to line failures in a network of switches. First, a protection route is generated using a topology of the network. Then, each switch in the proposed protection route checks whether the link that will pass the information onto the next switch can handle the proposed bandwidth requirements. If so, the protection route is stored in an inactive state at each switch so that if a failure occurs in the network, working routes affected may be quickly re-routed to the protection routes by placing the protection path in an active state at each switch and reserving the bandwidth.

Figure 2:
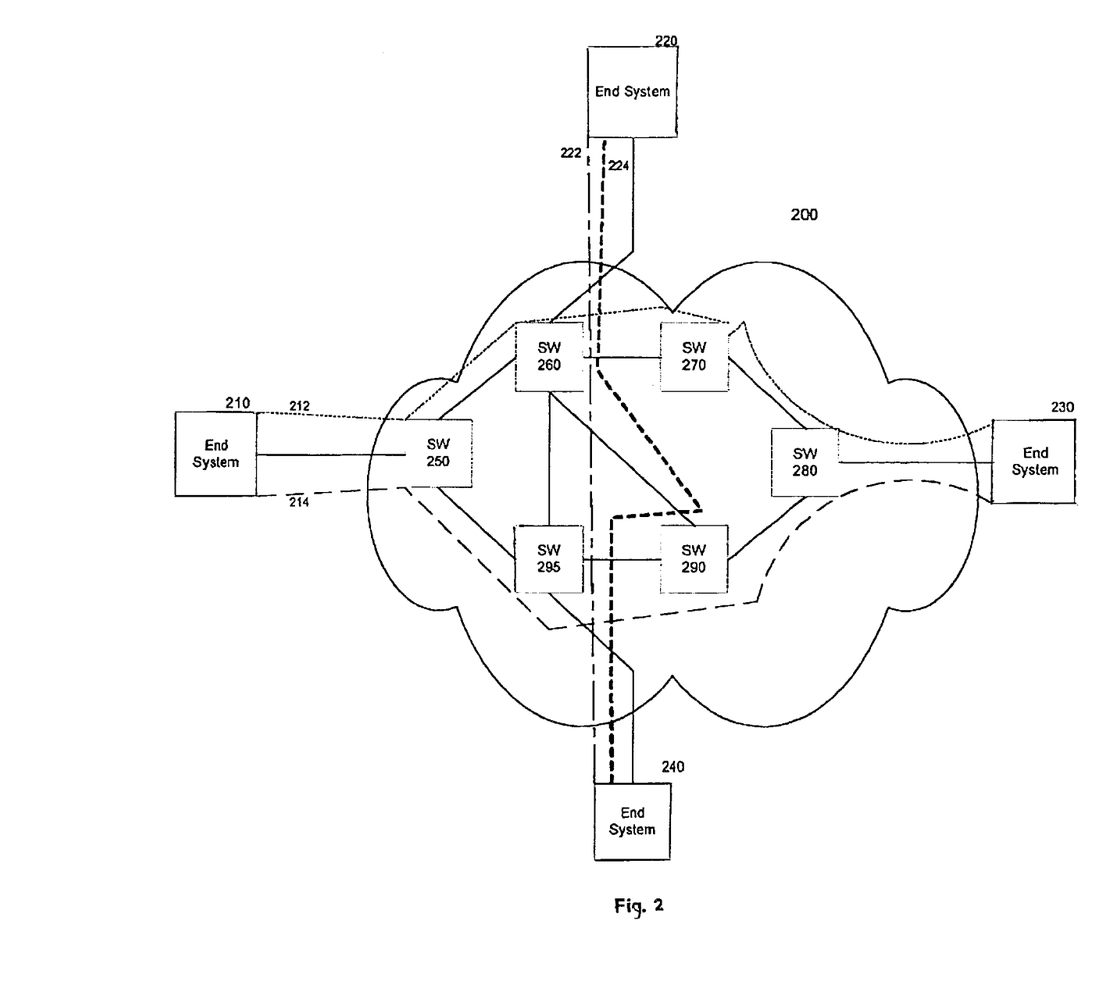
FIG. 2 shows a SONET network consistent with the present invention.

FIG. 2 shows a SONET network 200 including a plurality of switches 250–295 for passing information between end systems 210–240. In one embodiment, when network 200 is first initialized, each switch in the network automatically learns information about the other switches in the network and maintains a topology of the entire network. This allows for a single switch to generate routes between end systems. Generally, each switch passes information about itself to other switches which each maintain a database of this information. One method of creating and maintaining topology information at each switch is described in the related application "Routing and Signaling in a Sonet Network." In another embodiment, all of the switches do not need to maintain the entire topology of switches, and only one or more maintain the information to generate routes.

Path 212 is an example working route between end system 210 and 230 that passes over links and through switches 250, 260, 270 and 280. A link is the physical line connecting two switches that the route uses to pass information. Path 214 is an example protection route that protects path 212. Path 214 travels from end system 210 to end system 230 via switches 250, 295, 290, and 280. Path 222 is an example working route between end systems 220 and 240 that passes through switches 260 and 295. Path 224 is a protection route that protects path 222. Path 224 travels from end system 220 to end system 240 via switches 260, 290 and 295.

Figure 3A:
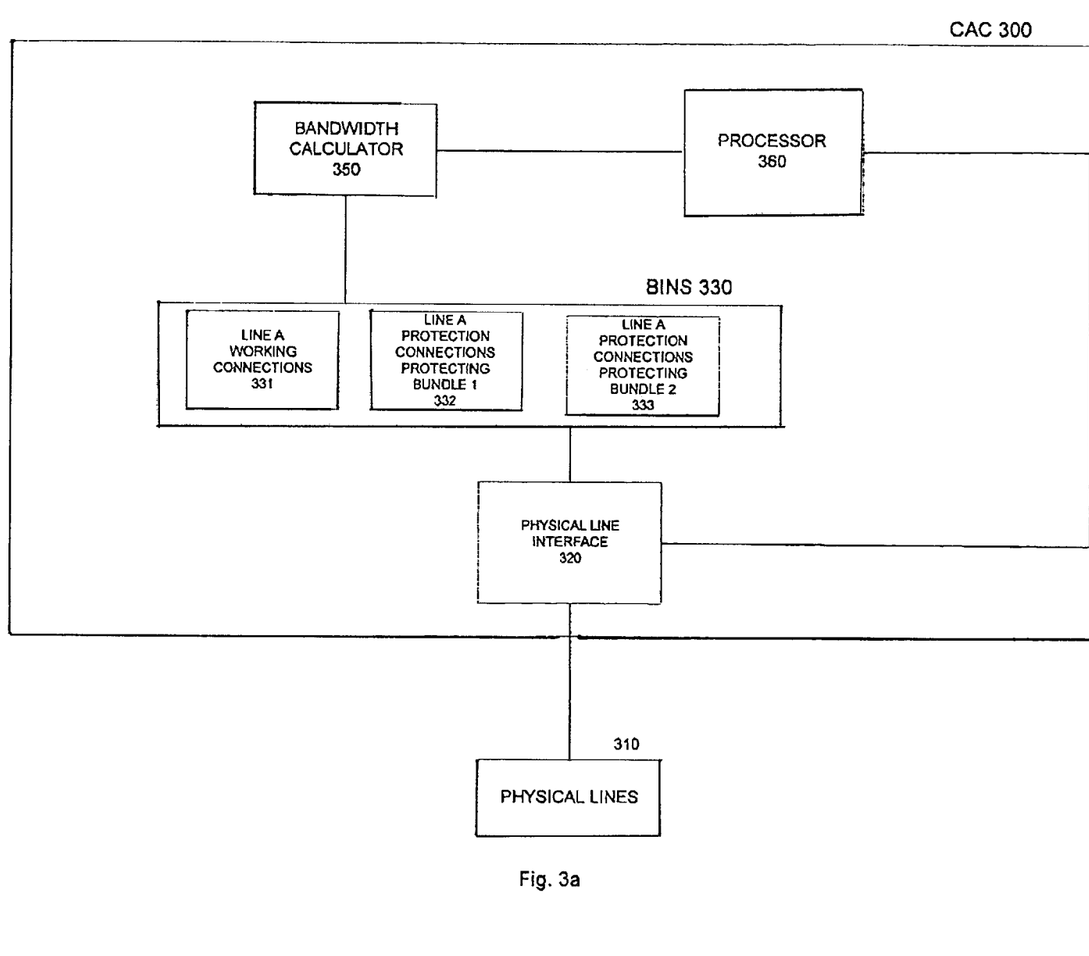
FIG. 3*a* shows a call admission control module included at switches in the network of FIG. 2 where connection priorities are not supported.
Figure 3B:
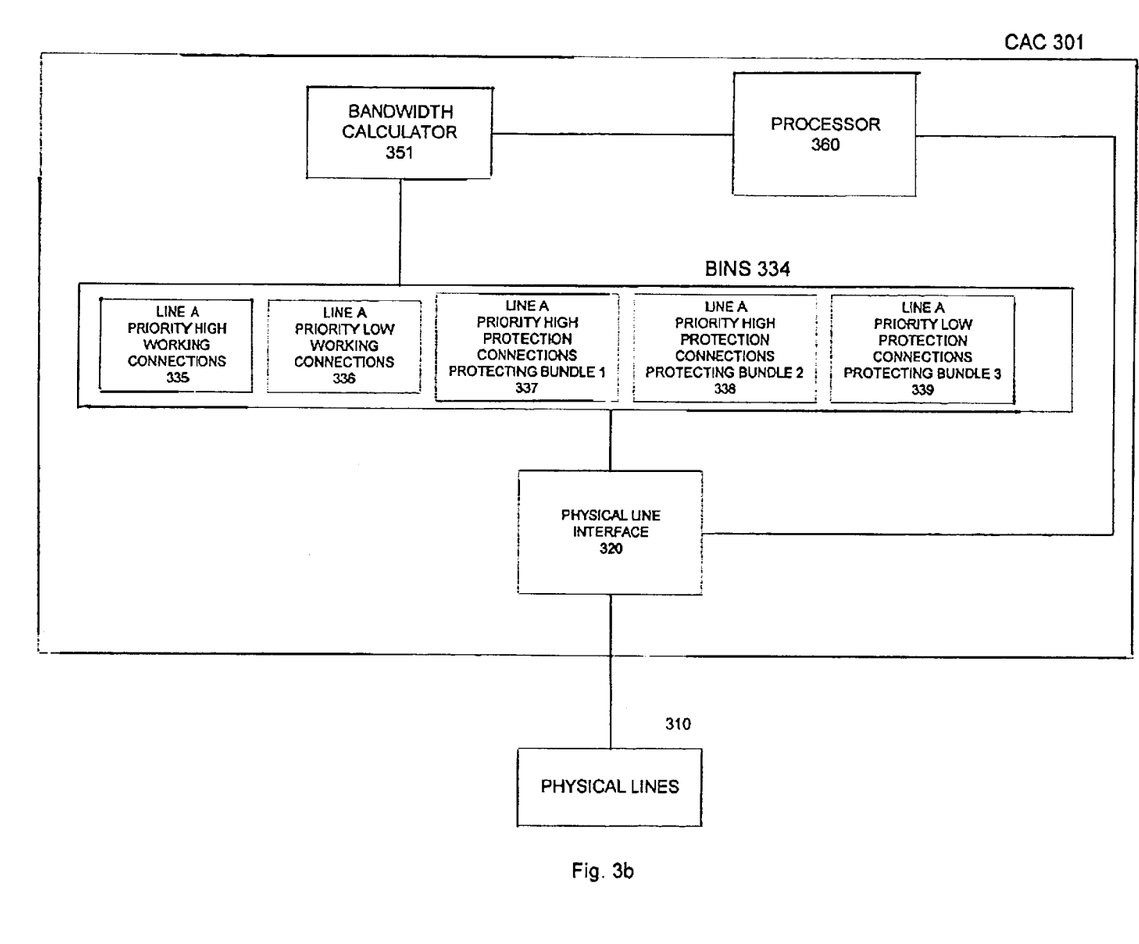
FIG. 3*b* shows a call admission control module included at switches in the network of FIG. 2 where connection priorities are supported.

FIG. 3a shows a call admission control module (CAC) 300 that is included in each switch in network 200 where connection priorities are not supported. A connection priority is a designation of the relative priority or importance of connections. For example, there may be two levels of priority—high and low.

bandwidth, CAC 301 takes into account a priority of paths through the switch. The priority of each path is stored at the switches.

CAC 300 and CAC 301 have physical control of every line that reaches the switch. CAC 300 and CAC 301 are connected to physical lines 310 through physical line interface 320. Physical line interface 320 includes layers of software for communicating between the physical lines 310 and CAC 300 or CAC 301. CAC 300 and CAC 301 are used to manage communications over physical links including working and physical connections. CAC also determines whether bandwidth is available on a given line for additional connections.

Referring to FIG. 3a, CAC 300 maintains a set of bins 330 for each link attached to the node to use in determining if a new connection (working or protection) can be added to a given line. Bins store connections for bandwidth computation purposes. There are two kinds of bins for each link: working and protection. There is one working bin and a separate protection bin for each set of protection connections that protect a same bundle. A bundle of lines consists of links or lines in a network deemed likely to fail simultaneously. These lines are assigned a network wide unique bundle identifier.

Using the example of FIG. 3a, for a given line or link A there are three bins. Bin 331 is associated with working connections that use line A, bin 332 is associated with protection connections that protect connections in bundle 1 that use or may use line A, and bin 333 is associated with protection connections that protect connections in bundle 2 that use or may use line A.

Using FIG. 2 as an example for bin assignments, assume that every link in the network belongs to a different bundle. For this example, the endpoints of the lines will be the bundle identifier. The following discussion pertains to a specific link, namely (295,290). The link connecting SW 295 and SW 290 belongs to a bundle with bundle ID (295, 290). Assume there is a working connection 232 in addition to protection connections 214 and 224. The following table summarizes the bins and connection contained in each bin where an 'x' means the connection belongs to the bin:

TABLE 1

| Connection | Bin (250, 260) | Bin (250, 295) | Bin (260, 295) | Bin (260, 270) | Bin (260, 290) | Bin (295, 290) | Bin (270, 280) | Bin (280, 290) | Working Bin |
|---|---|---|---|---|---|---|---|---|---|
| 232 |   |   |   |   |   |   |   |   | x |
| 214 | x |   |   |   | x |   | x |   |   |
| 224 |   |   | X |   |   |   |   |   |   |

FIG. 3b shows a call admission control module (CAC) 301 that is included in each switch in network 200 where connection priorities are supported. In evaluating If, for example, links (250, 260) and (260, 295) belonged to the same bundle with bundle identifier B1, the bins would have connections as indicated in Table 2 below:

TABLE 2

| Connection | Bin B1 | Bin (250, 295) | Bin (260, 270) | Bin (260, 290) | Bin (295, 290) | Bin (270, 280) | Bin (280, 290) | Working Bin |
|---|---|---|---|---|---|---|---|---|
| 232 |   |   |   |   |   |   |   | x |
| 214 |   |   |   | X |   | x |   |   |
| 224 | x |   |   |   |   |   |   |   |

Bandwidth calculator 350 in CAC 300 is used in determining whether there is sufficient bandwidth over a link to add a new route. Bandwidth calculator 350 uses the following equation to determine what bandwidth is available through a given link that connects to the switch:

$$C \geq \Sigma W_m = \max \Sigma P_{nj}.  \quad \text{Equation 1}$$

C=Maximum capacity of the link where calculation is performed;
$W_m$=Size of working connection m;
$P_{nj}$=Size of protection connection n if protection bundle j is being protected by the connection, 0 otherwise.

This inequality sums the bandwidth required in each bin such as bins 331, 332, and 333. A maximum of all of the protection bins is taken (max bins 332 and 333) and summed with the working connection bins (bin 331). The capacity of a link has to be larger than or equal to this sum.

The protection connection portion of the equation takes into account whether connections can share capacity. If protection connections protect the same bundles then it is likely that the protection connection will be active at the same time and cannot share capacity. If, however, protection connections do not protect the same bundles, it is less likely that the protection connections will be actively using bandwidth on a link at the same time and can share capacity. Each protection bin represents bandwidth for protection connections that can not share capacity and the bandwidth for each must be summed. The different bins, however, can share capacity, so only the largest of these is included in the final summation.

When a specific protection route is being proposed, bandwidth calculator 350 includes the proposed amount of bandwidth in the above calculation, and if the resulting bandwidth requirements are below the maximum available then the protection route is stored at the switch and the set-up message is passed on to the next switch in the protection route. If, however, there is not enough bandwidth, bandwidth calculator 350 forwards the originating switch notice of this problem so that a new protection route may be selected. Processor 360 facilitates sending information from the bandwidth calculator 350 to the physical line interface 320 for output over physical lines 310 based on the result of the calculation.

FIG. 3b shows a call admission control module (CAC) 301 that is included in each switch in network 200 where connection priorities are supported. For example, a high and low priority may be supported. CAC 301 maintains a set of bins 334 for each link attached to the node to use in determining if a new connection (working or protection) can be added to a given line. Using this example, there are two working bins for each line and a plurality of protection bins. The two working bins correspond to high priority working connections for line A 335 and low priority working connections for line A 336. In this example, there are three protection bins, one for each priority and each bundle of lines protected. Bin 337 corresponds to high priority protection connections that protect bundle 1 over line A, bin 338 corresponds to high priority protection connections protecting bundle 2 over line A, and bin 339 corresponds to low priority protection connections protecting bundle 3 over line A.

Using the example network of FIG. 2, assume that 232 (not shown), 212, 214, 222, and 224 are of high priority. Further assume that there is another working connection 242 (not shown) on the link that is of low priority. The bin content for the high priority would be the same as shown in Table 1. The bin content for the low priority would be as follows:

TABLE 3

| Connection | Bin (250, 260) | Bin (250, 295) | Bin (260, 295) | Bin (260, 270) | Bin (260, 290) | Bin (295, 290) | Bin (270, 280) | Bin (280, 290) | Working Bin |
|---|---|---|---|---|---|---|---|---|---|
| 242 | | | | | | | | | X |

Bandwidth calculator 351 in FIG. 3b must check two inequalities to determine if there is bandwidth available for a new connection. First, a check is performed on the high priority connections:

$$C \geq \Sigma W_m = \max \Sigma P_{nj} \quad \text{Equation 2}$$

C=Maximum capacity of the link where calculation is performed;
$W_m$=Size of high priority working connection m;
$P_{nj}$=Size of high priority protection connection n if protection bundle j is being protected by the connection, 0 otherwise.

This inequality sums the bandwidth required of all the high priority working and protection bins (bins 335, 337, and 338). Then a maximum is taken of the protection bins (max bins 337 and 338) and added to the sum of the high priority working bins (bin 335).

Second, a check is performed considering the low priority connections:

$$C - HPW \geq \Sigma W_m + \max \Sigma P_{nj}. \quad \text{Equation 3}$$

C=Maximum capacity of the link where calculation is performed;
HPW=High priority working bandwidth
$W_m$=Size of low priority working connection m;
$P_{nj}$=Size of high and low priority protection connection n if protection bundle j is being protected by the connection, 0 otherwise.

This inequality states that the sum of all the low priority working bins (bin 336) and a maximum of the high and low priority protection bins (bin 338) must be less than the capacity of the line minus the total high priority working bandwidth.

When a specific protection route is being proposed, bandwidth calculator 351 includes the proposed amount of bandwidth in the above calculations, and if the inequalities are both true then the protection route is stored at the switch and the set-up message is passed on to the next switch in the protection route. If, however, there is not enough bandwidth and either inequality is false, bandwidth calculator 351 forwards the originating switch notice of this problem so that a new protection route may be selected. Processor 360 facilitates sending information from the bandwidth calculator 351 to the physical line interface 320 for output over physical lines 310 based on the result of the calculation.

There are two basic parts to setting up a protection route prior to network failure. First, during an idle time, the origination switch must generate, if possible, a protection route that does not use the same bundles as the working route. Second, each switch in the proposed protection route must check whether the links connected to that switch have the capacity, or bandwidth, to handle the proposed connection.

Figure 4:
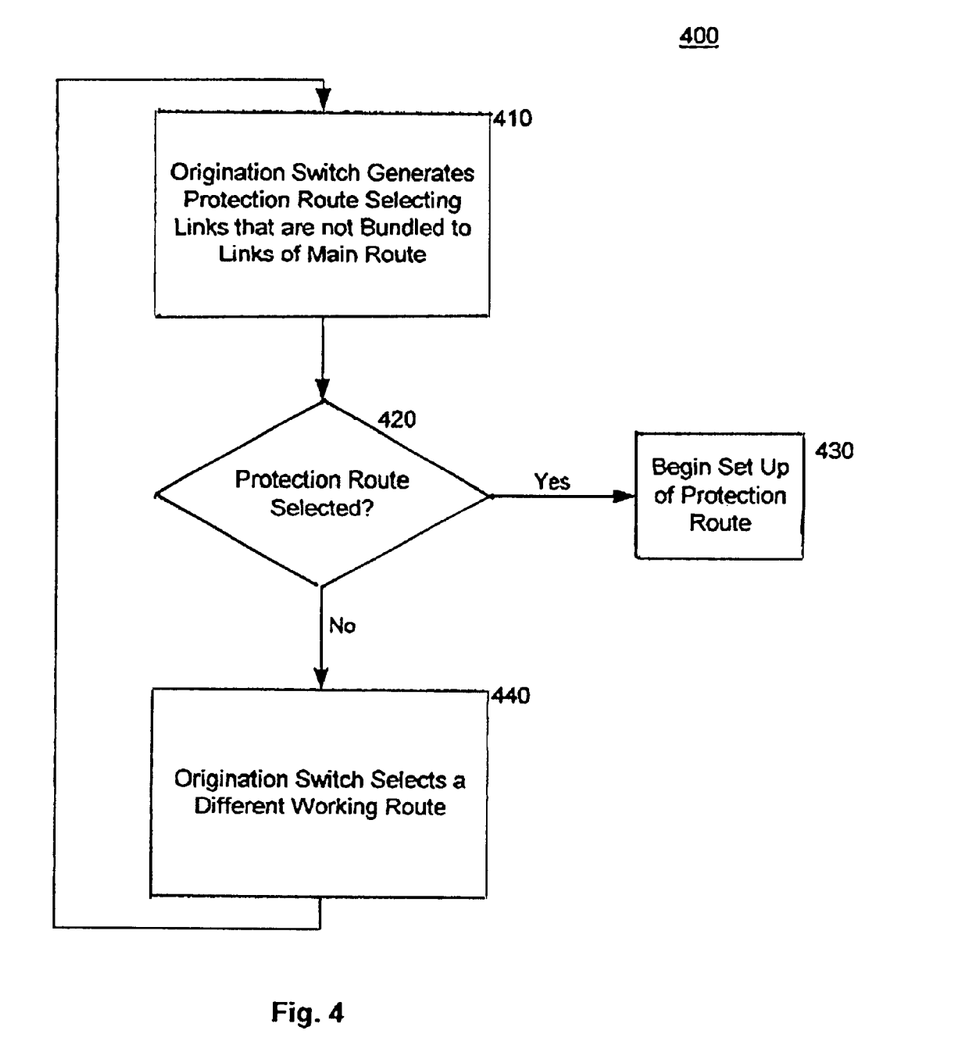
FIG. 4 shows the steps for automatically generating a protection connection route consistent with the present invention.

FIG. 4 shows the steps 400 for generating a protection route at the origination switch. Using the topology of the network of switches stored at the origination switch, the switch selects a series of switches that will pass information from one end system to another. The related application ?Routing and Signaling in a Sonet Network? describes one way of automatically generating a route. The origination switch generates a protection route for a given working route by selecting links that are not bundled to links of the main route during an idle time (step 410). In one embodiment, the origination switch disregards all links that are in the same bundles as links of the working route and then selects, from the remaining links, a path between the two end systems.

If a protection route is selected (step 420), then set up of the protection route may begin (step 430). However, if there was no route available that did not share links in the same bundles as the working route, then the origination switch selects a different working route (step 440). By selecting a different working route, it may now be possible to select a protection route and steps 400 are repeated. In one embodiment, the protection route and working route may have to share some links along the path between the two end systems. If it is not possible to have a protection route completely disjoint from the working route, more than one protection route may be computed and the combination of protection routes together will protect the working route. In another embodiment, if there is no protection route that is totally disjoint from the working route (i.e. does not use the same bundles as the working route), a protection route that is maximally disjoint (i.e. uses minimal overlapping bundles as the working route) may be selected.

Figure 5:
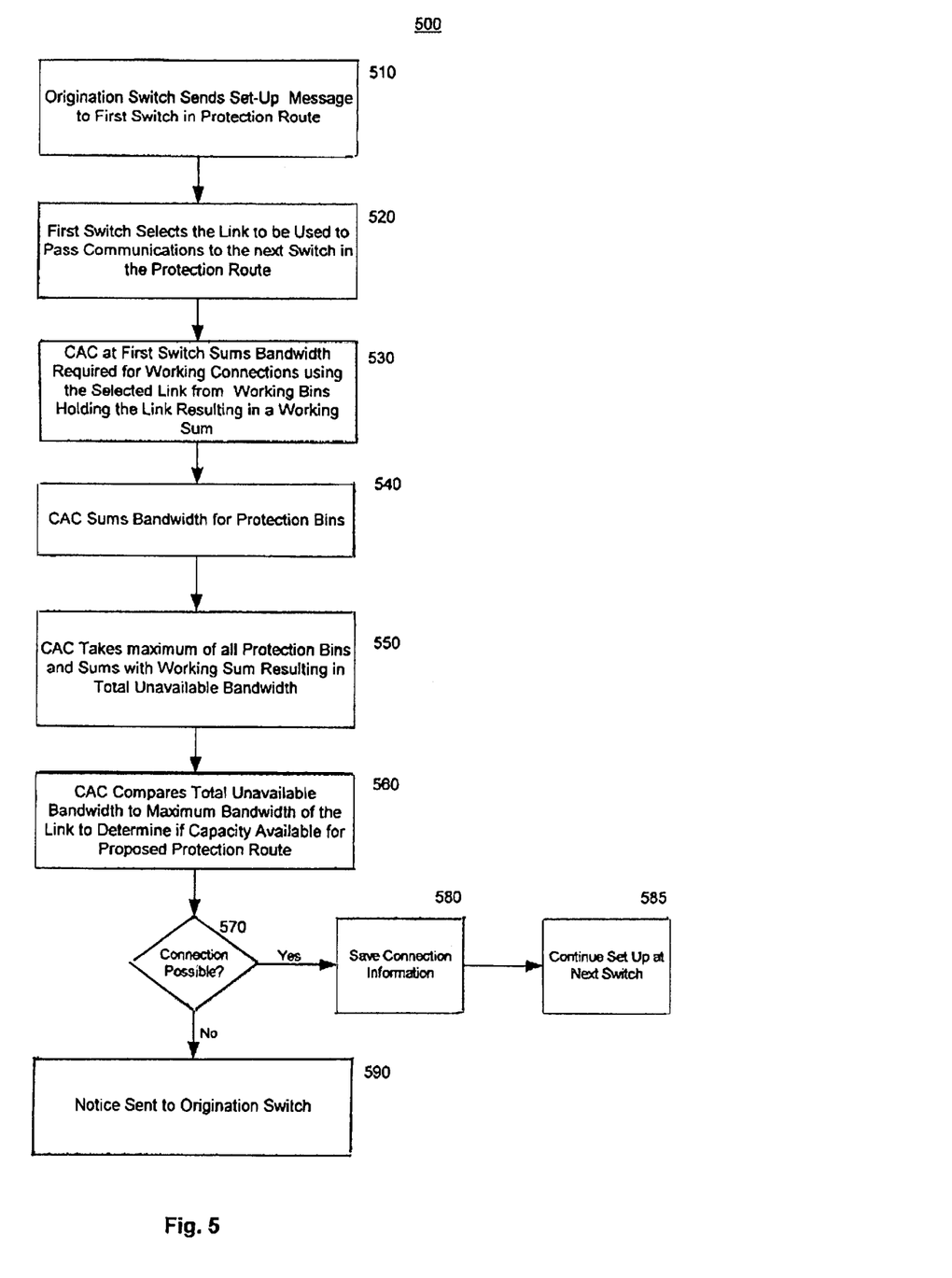
FIG. 5 shows the steps for checking for bandwidth at each switch in the protection connection route and setting up the protection connection route in accordance with the CAC shown in FIG. 3*a*.

FIG. 5 shows the steps 500 performed by switches in the protection route to determine if the bandwidth capacity is available to handle the protection route in a network that does not support priorities. A set-up message is passed to the switches in the protection route. The set-up message carries information about the associated working route that is being protected. Specifically it carries the bundle identifiers for all the bundles to which component links of the working route belong. Each switch stores this information about the working route to use in bandwidth analysis. When a protection route is stored, it is stored in a bin having protection routes that share bundles with the associated working route.

The origination switch sends a set-up message to the first switch in the protection route after determining if there is sufficient bandwidth available between the origination switch and the first switch (step 510). The first switch selects the link that will pass communications onto the next switch in the protection route (step 520). CAC 300 at the first switch sums all the working connections, including the proposed connection, from the working bins that use the selected link to find a working sum (step 530). CAC 300 sums the bandwidth required in each protection bin including the proposed connection (step 540). As previously discussed, the protection connections in a bin protect the same bundles and can not share capacity so a sum must be calculated. Next, CAC takes the maximum of the bandwidth over all the protection bins and sums the result with the working sum to arrive at the total unavailable bandwidth (step 550). Taking the maximum of the protection bins acknowledges that protection connections that do not protect the same bundles can share capacity as they are unlikely to be activated at the same time.

CAC 300 compares the total unavailable bandwidth to the maximum bandwidth available for the link to determine if the new connection is possible (step 560). If the unavailable bandwidth does not exceed the maximum bandwidth then the connection is possible (step 570), the connection is stored as inactive (step 580) and the set-up message is passed to the next switch in the protection route (step 585). If the bandwidth is not available, then notice is sent to the origination switch (step 590) so that a new protection route may be selected.

In another embodiment, where priorities are supported as described in FIG. 3b, steps 530–560 of FIG. 5 are replaced with the steps required to perform equations 2 in order to determine if a new protection route may be added.

The present invention allows for automatically selecting protection routes during idle periods prior to failure.

In one embodiment, set-up of the protection route only includes a logical creation of a route. The bandwidth is not actually reserved at each switch until needed after a failure on a working line.

In another embodiment of the present invention, the origination switch may periodically try to calculate a better working and/or protection route to the destination switch, such as a faster route. When a better route is found, the origination switch may request a call reroute or set up the new protection route.

There may be any combination, number, or type of priority levels. The working and protection routes may or may not have the same numbers and types of protection levels.

In yet another embodiment, there are four priority levels of transmission for the working lines and four or fewer priority levels for the protection lines.

In another embodiment, when a new connection request cannot be accommodated without bumping an existing connection, a bumping coordinator makes the decision about which, if any, connections should be bumped using the priority of each connection or bumping policies specified by the user.

In another embodiment, one or more switches in the network includes information summarizing the per-bin bandwidth utilization at all the other switches in the network. This allows an origination switch to perform the CAC checks for each of the switches in the protection route increasing the chance that the selected protection route will be successfully established.

In conclusion, systems and methods consistent with this invention provide for automatic creation and set up of protection routes prior to network failure.

It will be apparent to those skilled in the art that various modifications and variations can be made to the SONET network routing systems consistent with the present invention, and in construction of a network using such systems, without departing from the scope or spirit of the invention.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for generating a protection route as an alternative route to a working route between optical network switches through links connecting the switches in a network, comprising the steps of:

automatically selecting a protection route to pass messages from an origination switch to a destination switch through an intermediate switch where a minimal number of links included in physical bundles that correspond to the working route are included in the protection route;

sending a set up message from the origination switch to the destination switch through the intermediate switch;

determining whether bandwidth is available between the origination switch, the intermediate switch and the destination switch;

summing bandwidth reserved for all working connections associated with a link resulting in a working sum;

grouping protection connections that use the link into groups that protect the same bundles, including the selected protection connection;

summing bandwidth required for each group of protection connections;

taking a maximum of the summed protection connection bandwidths; and summing the maximum and the working sum resulting in a total unavailable bandwidth.

2. The method according to claim 1 further including the step of:

sending an error message to the origination switch when the total unavailable bandwidth is greater than the total capacity of the link.

3. The method according to claim 1 further including:

storing the selected protection route connection information at the switch when the total unavailable bandwidth does not exceed the total capacity of the link.

4. The method according to claim 1, wherein the step of automatically selecting includes the step of selecting a new working route if no protection route is available that does not share a bundle with the working route.

5. A method for generating a protection route as an alternative route to a working route between optical network switches through links connecting the switches in a network, comprising the steps of:

automatically selecting a protection route to pass messages from an origination switch to a destination switch through an intermediate switch where a minimal number of links included in physical bundles that correspond to the working route are included in the protection route;

sending a set up message from the origination switch to the destination switch through the intermediate switch;

determining whether bandwidth is available between the origination switch, the intermediate switch and the destination switch;

summing bandwidth reserved for a given priority of working connections associated with a link resulting in a working sum;

grouping protection connections of a same priority into groups that protect the same bundles, including the proposed protection connection;

summing bandwidth required for each group of protection connections of a given priority;

taking a maximum of the summed protection connection bandwidths of the given priority; and summing the maximum and the working sum resulting in a final sum.

6. The method according to claim 5 further including the step of:

sending an error message to the origination switch when the final sum is greater than the total capacity of the link.

7. A method for generating a protection route as an alternative route to a working route between optical network switches through links connecting the switches in a network, comprising the steps of:

automatically selecting a protection route to pass messages from an origination switch to a destination switch through an intermediate switch where a minimal number of links included in physical bundles that correspond to the working route are included in the protection route;

sending a set up message from the origination switch to the destination switch through the intermediate switch;

determining whether bandwidth is available between the origination switch, the intermediate switch and the destination switch;

summing bandwidth reserved for working connections of a first given priority associated with a link resulting in a first working sum;

summing bandwidth reserved for working connections of a second given priority associated with a link resulting in a second working sum;

grouping protection connections of a same priority into groups that protect the same bundles, including the proposed protection connection;

summing bandwidth required for each group of protection connections of a given priority;

taking a maximum of the summed protection connection bandwidths of the given priority;

summing the second working sum and the maximum resulting in a used bandwidth sum;

subtracting a total capacity of the link from the first working sum resulting in a capacity sum; and comparing the used bandwidth sum and the capacity sum.

8. The method according to claim 7 further including the step of:

sending an error message to the origination switch when the comparison results in the used bandwidth sum being greater than the capacity sum.

9. A switch for use in a system for generating a protection route as an alternative route to a working route between optical network switches through links connecting the switches in a network, said switch storing topology information associated with said network, said switch comprising:

means for automatically selecting a protection route to pass messages from an origination switch to a destination switch through an intermediate switch where a minimal number of links included in physical bundles that correspond to the working route are included in the protection route;

means for sending a set up message from the origination switch to the destination switch through the intermediate switch; and means for determining whether bandwidth is available between the origination switch, the intermediate switch and the destination switch;

wherein the means for determining includes:

means for summing bandwidth reserved for all working connections associated with a link resulting in a working sum;

means for grouping protection connections that use the link into groups that protect the same bundles, including the selected protection connection;

means for summing bandwidth required for each group of protection connections;

means for taking a maximum of the summed protection connection bandwidth; and means for summing the maximum and the working sum resulting in a total unavailable bandwidth.

10. The switch according to claim 9 further including:

means for sending an error message to the origination switch when the total unavailable bandwidth is greater than the total capacity of the link.

11. The switch according to claim 9 further including:

a memory storing the selected protection route connection information at the switch when the total unavailable bandwidth does not exceed the total capacity of the link.

12. A switch for use in a system for generating a protection route as an alternative route to a working route between optical network switches through links connecting the switches in a network, said switch storing topology information associated with said network, said switch comprising:

means for automatically selecting a protection route to pass messages from an origination switch to a destination switch through an intermediate switch where a minimal number of links included in physical bundles that correspond to the working route are included in the protection route;

means for sending a set up message from the origination switch to the destination switch through the intermediate switch; and means for determining whether bandwidth is available between the origination switch, the intermediate switch and the destination switch;

wherein the means for determining includes:

means for summing bandwidth reserved for all working connections of a given priority associated with a link resulting in a working sum;

means for grouping protection connections of a same priority into groups that protect the same bundles, including the proposed protection connection;

means for summing bandwidth required for each group of protection connections of a given priority;

means for taking a maximum of the summed protection connection bandwidth of the given priority; and means for summing the maximum and the working sum resulting in a final sum.

13. The switch according to claim 12 wherein the means for automatically selecting includes means for selecting a new working route if no protection route is available that does not share a bundle with the working route.

14. The switch according to claim 12 further including:

means for sending an error message to the origination switch when the final sum is greater than the total capacity of the link.

15. A switch for use in a system for generating a protection route as an alternative route to a working route between optical network switches through links connecting the switches in a network, said switch storing topology information associated with said network, said switch comprising:

means for automatically selecting a protection route to pass messages from an origination switch to a destination switch through an intermediate switch where a minimal number of links included in physical bundles that correspond to the working route are included in the protection route;

means for sending a set up message from the origination switch to the destination switch through the intermediate switch; and means for determining whether bandwidth is available between the origination switch, the intermediate switch and the destination switch;

wherein the means for determining includes:

means for summing bandwidth reserved for working connections of a first given priority associated with a link resulting in a first working sum;

means for summing bandwidth reserved for working connections of a second given priority associated with a link resulting in a second working sum;

means for grouping protection connections of a same priority into groups that protect the same bundles, including the proposed protection connection;

means for summing bandwidth required for each group of protection connections of a given priority;

means for taking a maximum of the summed protection connection bandwidth of the given priority;

means for summing the second working sum and the maximum resulting in a used bandwidth sum;

means for subtracting a total capacity of the link from the first working sum resulting in a capacity sum; and means for comparing the used bandwidth sum and the capacity sum.

16. The switch according to claim 15 further including:

means for sending an error message to the origination switch when the comparison results in the used bandwidth sum being greater than the capacity sum.

17. The method according to claim 1, further comprising:

storing in each of said optical network switches topology information associated with said network.

18. The method according to claim 5, further comprising:

storing in each of said optical network switches topology information associated with said network.

19. The method according to claim 7, further comprising:

storing in each of said optical network switches topology information associated with said network.

20. The switch according to claim 9, said switch storing topology information associated with said network.

21. The switch according to claim 12, said switch storing topology information associated with said network.

22. The switch according to claim 15, said switch storing topology information associated with said network.

* * * * *